United States Patent [19]

Huddleston et al.

[11] Patent Number: 5,534,611
[45] Date of Patent: Jul. 9, 1996

[54] SULFONATED AND CARBOXYLATED AMINOETHYLENEPHOSPHONIC ACID AND AMINOBIS (METHYLENE) PHOSPHINIC ACID

[75] Inventors: David A. Huddleston, Sugar Land; Robert K. Gabel, Houston, both of Tex.

[73] Assignee: Nalco Chemical Company, Naperville, Ill.

[21] Appl. No.: 373,142

[22] Filed: Jan. 17, 1995

Related U.S. Application Data

[63] Continuation-in-part of Ser. No. 143,017, Oct. 29, 1993, abandoned.

[51] Int. Cl.$^6$ ............... C08G 8/04; C08G 14/02; C08G 8/28
[52] U.S. Cl. ............ 528/129; 528/158; 528/229; 528/245.3; 528/360; 528/363; 528/364; 528/373
[58] Field of Search ................. 528/360, 363, 528/364, 373, 129, 229, 245.3, 158

[56] References Cited

U.S. PATENT DOCUMENTS

| | | | |
|---|---|---|---|
| 4,009,996 | 3/1977 | Würmli | 8/94.24 |
| 4,212,734 | 7/1980 | Redmore et al. | 210/58 |
| 4,466,836 | 8/1984 | Crump et al. | 160/90 |
| 4,561,901 | 12/1985 | Schilling | 106/277 |
| 4,640,818 | 2/1987 | Grierson et al. | 422/15 |
| 4,680,396 | 7/1987 | Crump et al. | 544/337 |
| 4,770,791 | 9/1988 | Crump et al. | 210/700 |
| 4,990,590 | 2/1991 | Schilling | 528/129 |
| 4,990,591 | 2/1991 | Schilling | 528/129 |
| 4,990,592 | 2/1991 | Schilling | 528/129 |
| 5,310,855 | 5/1994 | Walz et al. | 528/137 |

*Primary Examiner*—Jeffrey Mullis
*Assistant Examiner*—P. Hampton-Hightower
*Attorney, Agent, or Firm*—Robert A. Miller; James J. Drake

[57] ABSTRACT

Novel sulfonated or carboxylated and phosphonomethylated polymers are prepared by first sulfoalkylating or carboxyalkylating polyamines followed by linking of the polyamines through a bis(methylene)phosphinic acid divalent group to form polymers which are then phosphonomethylated.

19 Claims, No Drawings

SULFONATED AND CARBOXYLATED AMINOETHYLENEPHOSPHONIC ACID AND AMINOBIS (METHYLENE) PHOSPHINIC ACID

This application is a continuation in part of Ser. No. 08/143,017 filed Oct. 29, 1993 now abandoned.

Compounds coming aminomethylenephosphonic acid groups are effective inhibitors for scale such as calcium, barium, magnesium, carbonate, phosphate, sulfate, silicate, etc., which may be formed in commercial waters such as cooling water, boilers and oil well process waters. Aminoethylenephosphonic acids are conveniently prepared by reacting amines and polyamines with formaldehyde and phosphorous acid in the presence of a strong mineral acid such as hydrochloric acid. [K. Moedritzer and R. R. Irani, J.O.C., 31, 1603 (1966(] as illustrated in the following reactions:

$$RNH_2 + 2CH_2O + 2H_3PO_3 \xrightarrow[100° C., Reflux]{Conc. HCl} RN(CH_2PO_3H_2)_2$$

$$H_2NCH_2CH_2NH_2 + 4CH_2O + 4H_3PO_3$$

$$\downarrow \text{Conc. HCl, } 100° C., Reflux$$

$$(H_2O_3PCH_2)_2NCH_2CH_2N(CH_2PO_3H_2)_2$$

Amines and polyamines which have been phosphonomethylated and also contain sulfonic acid groups have been found to be effective threshold scale inhibitors, capable of operating in high hardness waters (50,000 ppm of scale forming salts) and at high temperatures (350° F.). (U.S. Pat. No. 4,212,734, Redmore and Welge, July 1980). These molecules are prepared by reacting an amine or polyamine with a sulfoalkylating reagent such as propane sultone or sodium chlorohydroxypropylsulfonate as the first step. The sulfonated amine is phosphonomethylated as shown in the following reactions:

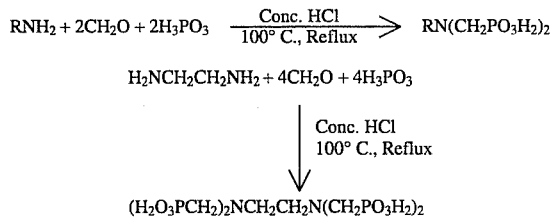

$$RNH(CH_2)_3SO_3H + CH_2O + H_3PO_3 \xrightarrow[100° C., Reflux]{Conc. HCl}$$

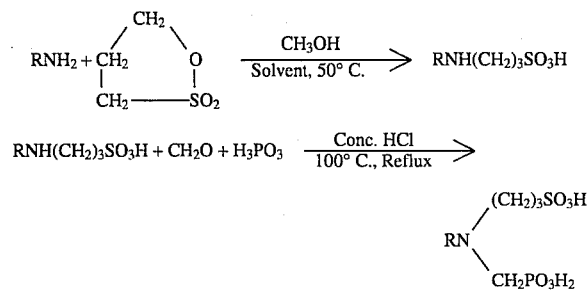

Heterocyclic and bicyclic polyamines have been sulfoalkylated using sodium chlorohydroxypropylsulfonate and then were phosphonomethylated. These compounds are useful as chelating agents, threshold scale inhibitors and cement retarders. (U.S. Pat. No. 4,500,356, Crumpet al, Febraury 1985 and U.S. Pat. No. 4,466,835, Crumpet al, August 1984). Synthesis of these compounds is illustrated by the following reactions:

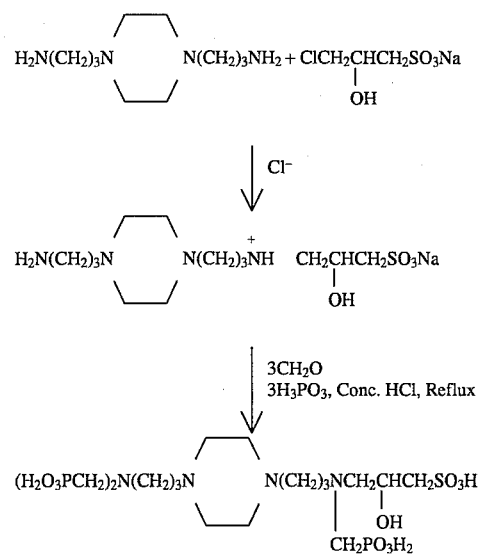

Polymethylenephosphonic acid derivatives of amine polymers such as those prepared by reacting aminoethylpiperazine with a dihalo, diepoxy or epoxyhalo compound have superior scale inhibiting properties. (U.S. Pat. No. 4.466.836, Crumpet al, 8/84).

The following reactions illustrate the preparation of phosphonomethylated amine polymers:

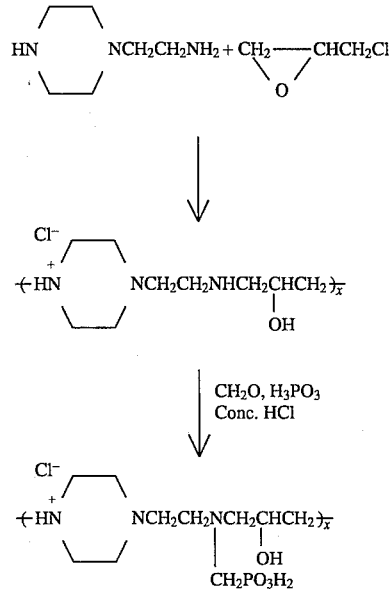

Amines and polyamines can also be derivatized to introduce both carboxylic acid groups and phosphonic acid groups. Compounds of this type are known to be useful chelating agents, sequestering agents and threshold scale inhibitors. An example of the synthesis of these types of compounds is shown by the following reactions:

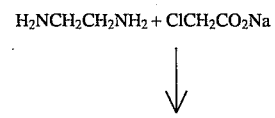

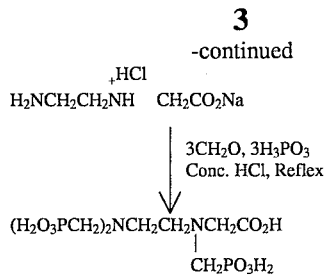

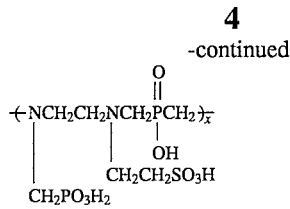

It has now been discovered that new phosphonomethylated and sulfoalkylated and/or carboxymethylated amine polymers can be prepared by procedures which combine the chemical techniques described in the preceeding paragraphs but in addition form polymers by reacting the derivatized polyamines with formaldehyde and hypophosphorous acid or salts thereof. The resulting amine polymers now contain phosphonic acid, sulfonic acid and/or carboxylic acid as well as phosphinic acid functional groups. Compositions of this type are useful as scale inhibitors, corrosion inhibitors and dispersants in industrial cooling water, boiler water, oil well process water and other process waters.

The unique features of these new compositions are: (1) Functional groups which are known to contribute to scale inhibiting, chelating, sequestering, dispersing, and corrosion inhibiting ability, such as the aminoalkylphosphonates, aminoalkylsulfonates, aminoalkylcarboxylates, aminoalkylphosphinates can be incorporated into into one polymer molecule. (2) New polymers can be prepared from polyamines wherein the type and amount of functional groups can be varied which permits "tailoring" of the molecule to fit the precise water conditions, i.e., increase sulfonic groups for polymer solubility in high hardness water; increase phosphonic and phosphinic groups for better calcium phosphate or carbonate scale inhibition; increase carboxylic and phosphinic groups for better chelation; vary polymer molecular weight to alter solubility of the polymer as process water hardness changes or to change dispersant character of the polymer. (3) Although other crosslinking agents have been used before, such as dihalo compounds or epoxyhalo compounds, linking is done using hypophosphorous acid and its salts in combination with formaldehyde to form bis(methylene)phosphinic acid (or salts) bridges between starting polyamine units. Thus, while the polymer is being formed, the additional chelating and scale inhibiting functionality of the phosphinic group is simultaneously built into the polymer molecule. The following reactions illustrate polymer formation using a sulfoethylated polyamine:

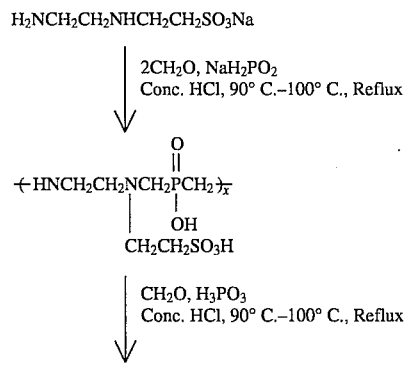

SUMMARY OF THE INVENTION

The polymers of this invention are alkylene polyamines which have been sulfoalkylated and/or carboxyalkylated, then linked together by bis(methylene) phosphinic acid groups or salts thereof and finally derivatized by phosphonomethylation, having the following formula:

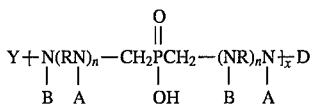

wherein the group $N(RN)_n$ is a polyamine in which R may be alkyl containing 2 to 6 carbon atoms or, taken with N may be a piperazinyl radical, with n being a whole number of from 1–15; A, B, D and Y are each independently selected from the group consisting of:

a. hydrogen;

b. carboxylic acid containing groups selected from the groups consisting of: alkyl substituted alkylene carboxylic acids containing 1 to 6 carbon atoms or salts thereof;

c. sulfonic acid containing groups selected from the group consisting of: methylene, ethylene and propylenesulfonic acid or salts thereof; 2-hydroxypropylsulfonic acid and salts thereof, 2-acrylamido-2-methyl propanesulfonic acid and salts thereof;

d. methylenephonsphinic acid and salts thereof; and e. methylenephosphonic acid or its salts thereof;

and wherein x is a whole number of from 1 to 20, and A,B,D, and Y taken together include per each mole of said polyamine, at least 0.5 mole, of methylene phosphonic acid or salts thereof and at least 0.5 mole of a compound selected from the group consisting of said sulfonic acid containing groups or said carboxylic acid containing groups.

In a preferred embodiment of this invention, R is an alkyl group having 2 carbon atoms and the polymer has the structure:

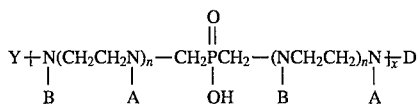

A,B,D, and Y, n and x each have the same values as stated above, and A,B,D, and Y taken together include per each occurance of $N(CH_2CH_2N)$, at least 0.5 occurance of methylene phosphonic acid or salts thereof and at least 0.5 occurance of a compound selected from the group consisting of said sulfonic acid containing groups or said carboxylic acid containing groups.

DETAILED DESCRIPTION OF THE INVENTION

The polymers of this invention are made by reacting polyalkylene polyamines such as polyethylene polyamine with sulfoalkylating reagents as the first stage of a three stage reaction sequence. Common sulfoalkylating reagents that may be used are formaldehyde-sodium bisulfite, sodium isethionate, propane sultone, sodium 3-chloro-2-hydroxypropylsulfonate or sodium 2-acrylamido-2-methylpropanesulfonate. Reactions illustrating the sulfoalkylation of the polyamines are as follows:

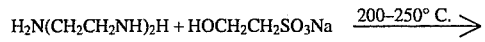

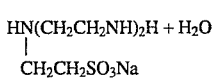

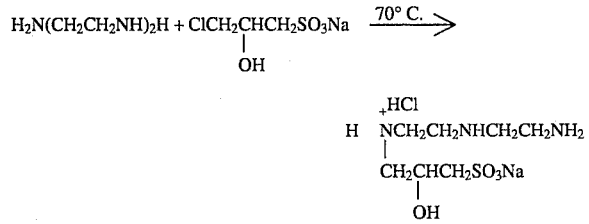

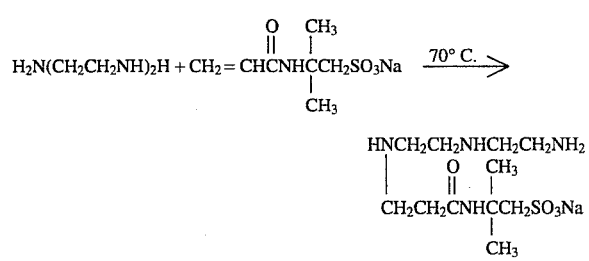

The extent of sulfoalkylation may be varied from 0.5 sulfoalkyl groups to 3.0 sulfoalkyl groups per mole of polyamine depending on the number of N—H groups available in the starting polyamine. All N—H groups must not be reacted since some N—H sites must be left to react with formaldehyde and hypophosphorous acid and to be phosphonomethylated.

As an alternate first stage of the reaction sequence or in addition to sulfoalkylation, the starting polyamine may be carboxymethylated. This reaction is done using sodium chloroacetate to attach carboxymethyl groups to the polyamine as shown in the following reaction:

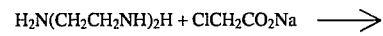

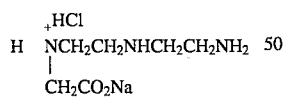

Other lower alkylene carboxylic acid containing groups may be attached to the polyamine by Michael addition of acrylate esters, methacrylate esters, acrylic acid and methacrylic acid and salts, acrylamide, acrylonitrile, maleate esters and itaconite esters to primary and secondary amine sites of the polyamine. Subsequent hydrolysis of the ester, amide or nitrile group in hydrochloric acid during the phosphonomethylation stage of the reaction sequence generates the free carboxylic acid group as shown in the following reactions:

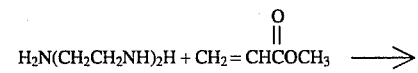

-continued

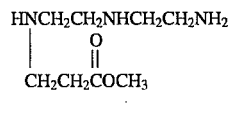

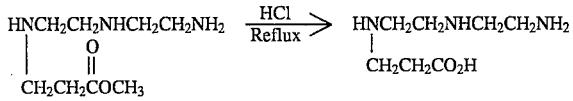

Lower alkylene carboxylic acid containing groups which are attached to the polyamine as described above usually contain from 1 to 6 carbon atoms with the methylenecarboxylic acid group being preferred. The extent of attachment of the lower alkylene carboxylic acid group to the polyamine may be varied from 0.5 alkylene carboxylic groups to 3.0 alkylene carboxylic acid groups per mole of polyamine.

The second stage of the reaction sequence involves joining or linking sulfoalkylated or carboxyalkylated polyamines together by means of a bis(methylene)phosphinic acid or salts divalent group. This is accomplished by reacting the sulfoalkylated polyamine with a 2:1 mole ratio of formaldehyde and sodium hypophosphite monohydrate under strongly acidic conditions (conc. hydrochloric acid) and at about 90°–100° C. These are reaction conditions commonly used for phosphonomethylation of amines [Moedritzer and Irani, J.O.C., 31, 1603 (1966)]. The extent of the linking reaction may be varied from reacting 0.5 mole of hypophosphite to 1.5 moles of hypophosphite per mole of starting polyamine. The linking reaction must not be done in excess or extensive crosslinking and gellation of the polymer could result. Factors affecting the extent of the linking include number of N—H groups left in the sulfoalkylated or carboxymethylated polyamine and number of N—H groups needed for the phosphonomethylation stage. The linking stage of the reaction sequence is illustrated by the reaction that follows:

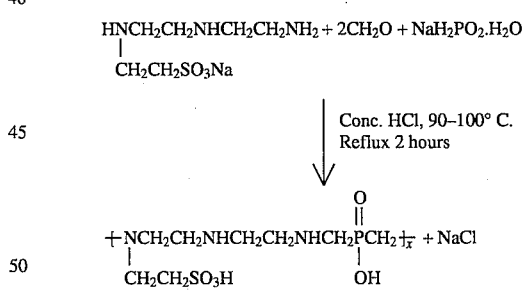

The final stage of the reaction sequence is phosphonomethylation of the sulfoalkylated or carboxyalkylated polyamine polymer. This is done by reacting the sulfoalkylated or carboxyalkylated polyamine polymer with formaldehyde and phosphorous acid in a 1:1 mole ration using the usual conditions for phosphonomethylation. The extent of phosphonomethylation may be varied from 0.5 phosphonomethyl groups to 3.0 phosphonomethyl groups per mole of starting polyamine. The amount of phosphonomethylation to be done is determined by the application for which the polymers are to be used and the availability of N—H groups in the substituted linked polyamine polymer. The phosphomethylation stage of the reaction sequence is illustrated by the reaction that follows:

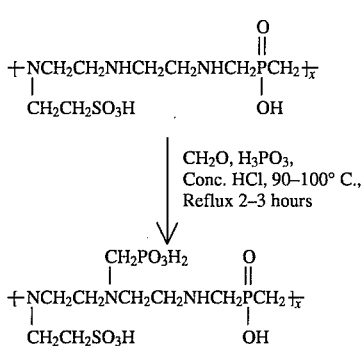

Although the reaction sequence of this invention has been described above as proceeding in three stages, it is sometimes convenient in practice to combine the stage of linking the polyamines via the divalent bis(methylene)phosphinate group with the phosphonomethylation stage. Both reactions are done under the same conditions and, as long as sufficient formaldehyde is provided to maintain a mole ratio of 2:1 formaldehyde to hypophosphite and a 1:1 mole ratio of formaldehyde to phosphorous acid, the two stages can be combined. Whether performed in three stages or two stages, the reaction sequence is most conveniently done as a "one pot" reaction.

Polyamines most useful in this invention are the common polyethylene amines as represented by the formula:

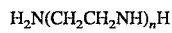

where n is 1 to 15 and include:
Ethylenediamine (EDA)
Diethylenetriamine (DITRI)
Triethylenetetramine (TETA)
Tetraethylenepentamine (TEPA)
Examples of other suitable polyamines include:
Propylenediamine
Dipropylenediamine
Butylenediamine
Hexamethylenediamine
Tetramethylenediamine
Pentamethylenediamine
Dihexamethylenetriamine
Tripropylenetetramine
Other polyamines such as polyethyleneimines and ethylene dichloride-ammonia condensation products may also be used. Commerically available polyamines often contain piperazine, and the use of polyamines containing piperazine linkages as part of the polyamine chain is contemplated herein.

Polyamines used in this invention will contain varying amounts of N—H groups depending on chain length. While all of these N—H groups may be reacted during the three stages of the reaction sequence, usually some N—H groups are left unreacted. The total moles of reagents for sulfoalkylation and/or carboxyalkylation, phosphonomethylation and bis(methylene)phosphinic acid group linking of polyamines should not exceed the total moles of N—H groups available in the starting polyamine. After the sulfoalkylation and/or carboxyalkylation of the starting polyamine, sufficient N—H sites should be left in the polyamine to permit linking of polyamine units by the bis(methylene)phosphinic acid groups and to allow for phosphonomethylation of the polymer. In the polymers of this invention, at least one-half mole of alkylene sulfonic acid group and/or carboxylic acid containing group and at least one-half mole of methylenephosphonic acid group per mole of polyamine contained in the polymer should be present in order to have polymers which are effective as scale inhibitors, corrosion inhibitors and dispersants.

The following examples illustrate the procedures for preparing the polymers of this invention:

EXAMPLE 1

Tetraethylenepentamine (TEPA) (equivalent weight, 42.18 g/amine nitrogen) (63.6 g, 1.51 equivalents=0.302 mole of polyamine) was combined with sodium isethionate (75.6 g, 0.51 mole) and the mixture was heated at 200° to 250° C. while collecting about 9 ml of water of condensation. The reaction mixture was cooled to about 100° C. and neutralized slowly with conc. hydrochloric acid (37%) (224.0 g, 2.27 moles) while holding the temperature at about 100° C. to prevent solidification. The mixture was then cooled to about 70° C. and sodium hypophosphite monohydrate (27.06 g, 0.255 mole) was added. The reaction mixture was heated to 90°–95° C. and formalin (37% formaldehyde) (42.07 g, or 15.57 g $CH_2O$, 0.519 mole) was added dropwise over 20 minutes. Phosphorous acid (70.1% concentration (59.8 g or 41.92 g $H_3PO_3$, 0.511 mole) was added. Formalin (37% concentration) (42.07 g or 15.57 g $CH_2O$, 0.519 mole) was again added dropwise over about 25 minutes while maintaining the temperature at 90°–95° C. When formalin addition was completed, the reaction mixture was refluxed mildly for 2 hours. The mixture was cooled and diluted with 56.9 g of deionized water to produce 31.98% of polymeric polyamines containing sulfonic, phosphonic and phosphinic acid functionality. Molecular weight for the polymer was determined by GPC to be $M_w$ 3100. For this reaction product, mole ratios of reactants used per mole of polyamine were about 0.85 for $NaH_2PO_2$, 1.7 for $H_3PO_3$ and 1.7 for $HOCH_2CH_2SO_3Na$.

EXAMPLE 2

To tetraethylenepentamine (TEPA) (eaquivalent weight, 42.18 g/amine nitrogen) (63.6 g, 1.51 equivalents=0.302 mole) and deionized water (29.3 g) was added slowly at 40°–50° C. sodium chloroacetate (29.7 g, 0.255 mole). This mixture was heated at 80° C. for 30 minutes. Then concentrated hydrochloric acid (37%) (150.9 g, 1.530 moles), 70.1% phosphorous acid (29.9 g or 20.96 g $H_3PO_3$, 0.256 mole) and sodium hypophosphite monohydrate (27.0 g, 0.255 mole) was added. The reaction mixture was heated to 90°–95° C. and formalin (37% formaldehyde) (63.2 g, 0.779 mole) was added dropwise over 45 minutes. After the formalin addition was completed, the mixture was refluxed for 2 hours longer, then was cooled and neutralized to pH 3.0 using 50% sodium hydroxide (65.6 g, 0.82 mole). Concentration of the final product as the acid form was 28.19%.

USEFULNESS OF THE POLYMERS IN COMMERCIAL APPLICATIONS

The novel sulfonated and/or carboxylated aminoethylene phosphonic acid and aminobis (methylene) phosphinic acid polymers of this invention have many areas of usefulness in industry. The wide variety and amount of anionic functionality (phosphonic, phosphinic, carboxylic, sulfonic groups) that can be built into these amine polymers make them useful as inhibitors for scale such as calcium, barium and magnesium carbonate, phosphate, sulfate and silicate in cooling water, boiler water, oil well process water and mining water. The multifunctional polymers of this invention can act as dispersants for scale in cooling water and boilers and as dispersants for slurries of solids. Aminocarboxylic, aminophosphonic, aminosulfonic and aminophosphinic polymers may be used as corrosion inhibitors in cooling water and boilers. In these applications, salts of the sulfonic, phosphonic, carboxylic and phosphinic acids containing polymers may be used such as, the ammonium, sodium, potassium, zinc or alkaline earth salts.

Having described our invention, we claim:

1. A composition prepared by:
   1. reacting a polyethylene polyamine with a compound selected from the group consisting of sulfoalkylation agents and carboxymethylation agents to form a sulfoalkylated or carboxylated polyamine;
   2. reacting said sulfoalkylated or carboxyalkylated polyamine with formaldehyde and a hypophosphorous acid selected from the group consisting of hypophosphorous acid or its water soluble salts to form linked sulfoalkylated or carboxyalkylated polyamines; and then,
   3. phosphonomethylating the linked sulfoalkylated and or carboxyalkylated polyamines, said composition having the following formula:

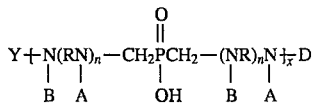

wherein the group N(RN)$_n$ is a polyamine in which R is alkyl containing 2 to 6 carbon atoms or, taken with N is a piperazinyl radical, with n being a whole number of from 1–15; A, B, D and Y are the same or different and are independently selected from the group consisting of:
   a. hydrogen;
   b. carboxylic acid containing groups selected from the groups consisting of: alkyl substituted alkylene carboxylic acids containing 1 to 6 carbon atoms or salts thereof;
   c. sulfonic acid containing groups selected from the group consisting of: methylene, ethylene and propylenesulfonic acid or salts thereof; 2-hydroxypropylsulfonic acid and salts thereof; 2-acrylamido-2-methyl propanesulfonic acid and salts thereof;
   d. methylenephonsphinic acid and salts thereof; and
   e methylenephosphonic acid or its salts thereof;
wherein x is a whole number of from 1 to 20, and A,B,D, and Y taken together include per each mole of said polyamine, at least 0.5 mole of methylene phosphonic acid or salts thereof and at least 0.5 mole of a compound selected from the group consisting of said sulfonic acid containing groups or said carboxylic acid containing groups.

2. The compositions of claim 1 where n is 1 to 4.

3. A composition prepared by:
   1. Reacting a polyethylene polyamine with a compound selected from the group consisting of sulfoalkylation agents and carboxyalkylation agents to form a sulfoalkylated or carboxyalkylated polyamine;
   2. reacting said sulfoalkylated or carboxyalkylated polyamine with formaldehyde and a hypophosphorous acid selected from the group consisting of hypophosphorous acid and its water soluble salts to form linked sulfoalkylated or carboxyalkylated polyamines;
   3. phosphonomethylating the linked sulfoalkylated and or carboxyalkylated polyamines, said composition having the following formula

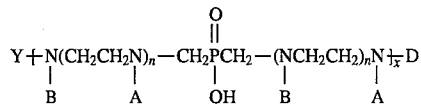

wherein n is a whole number of from 1–15; A, B, D and Y are the same or different and are independently selected from the group consisting of:
   a. hydrogen;
   b. carboxylic acid containing groups selected from the groups consisting of: alkyl substituted alkylene carboxylic acids containing 1 to 6 carbon atoms or salts thereof;
   c. sulfonic acid containing groups selected from the group consisting of: methylene, ethylene and propylenesulfonic acid or salts thereof; 2-hydroxypropylsulfonic acid and salts thereof; 2-acrylamido-2-methyl propanesulfonic acid and salts thereof;
   d. methylenephonsphinic acid and salts thereof; and
   e. methylenephosphonic acid or its salts thereof;
wherein x is a whole number of from 1 to 20, and A,B,D, and Y taken together include per each mole of N(CH$_2$CH$_2$N), at least 0.5 mole of methylene phosphonic acid or salts thereof and at least 0.5 mole of a compound selected from the group consisting of said sulfonic acid containing groups or said carboxylic acid containing groups.

4. The composition of claim 1 containing from 0.5 to 3.0 moles of said sulfonic acid containing group or said carboxylic acid containing group per mole of polyamine.

5. The composition of claim 1 containing from 0.5 to 3.0 moles of methylenephosphonic acid per mole of polyamine.

6. The composition of claim 1 containing at least 0.5 mole of methylene phosphonic acid or its salts and at least 0.5 mole of said sulfonic acid containing group per mole of polyamine.

7. The composition of claim 1 containing at least 0.5 mole of methylene phosphonic acid or salts thereof and at least 0.5 mole of said carboxylic acid containing group per mole of polyamine.

8. The composition of claim 2 wherein the polymer contains at least 0.5 mole of methylene phosphonic acid or salts thereof and at least 0.5 mole of said sulfonic acid containing group per mole of polyamine.

9. The composition of claim 2 wherein the polymer contains at least 0.5 mole of methylene phosphonic acid or salts thereof and at least 0.5 mole of said carboxylic acid group per mole of polyamine.

10. The composition of claim 1 wherein the hyphosphorous acid is sodium hypophosphite monohydrite.

11. The composition of claim 1 wherein the hypophosphorous acid is sodium hypophosphite monohydrite and one mole of said sulfoalkylated or carboxymethylated alkylene polyamine is reacted with a 2:1 mole ratio of formaldehyde and said sodium hypophosphite.

12. The composition of claim 3 wherein the hyphosphorous acid is sodium hypophosphite monohydrite.

13. The composition of claim 3 wherein the hypophosphorous acid is sodium hypophosphite monohydrite and one mole of said sulfoalkylated or carboxymethylated alkylene polyamine is reacted with a 2:1 mole ratio of formaldehyde and said sodium hypophosphite.

14. A composition having the formula:

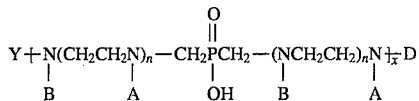

wherein n is a whole number of from 1–15; A, B, D and Y are the same or different and are independently selected from the group consisting of:
  a. hydrogen;
  b. a sulfonic acid containing groups selected from the group consisting of: methylene, ethylene and propylenesulfonic acid or salts thereof; 2-hydroxypropylsulfonic acid and salts thereof; 2-acrylamido-2-methyl propanesulfonic acid and salts thereof;
  c. methylenephonsphinic acid and salts thereof; and
  d. methylenephosphonic acid or its salts thereof;
wherein x is a whole number of from 1 to 20, and A,B,D, and Y taken together include per each mole of $N(CH_2CH_2N)$, at least 0.5 mole of methylene phosphonic acid or salts thereof and at least 0.5 mole of said sulfonic acid containing groups, said composition being prepared by the steps of:
  i. Reacting a polyethylene polyamine having the formula

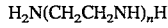

where n is a whole number of from 1 to 15 with a sulfoakylation reagent selected from the group consisting of sodium isethionate, propane sultone, sodium 3-chloro-2 hydroxypropylsulfonate, sodium 2-acrylamido-2-methylpropanesulfonate, and formaldehyde-sodium bisulfite adducts to produce a sulfoalkylated polyamine;
  ii. Reacting said sulfoalkylated polyamine with a mixture of formaldehyde and a hypophosphorous acid selected from the group consisting of hypophosphorous acid and its water soluble salts to produce a linked polyamine; and then,
  iii. Reacting said linked polyamine with phosphorous acid and formaldehyde to produce a phosphonomethylated polyamine composition.

15. The composition of claim 14 wherein the hyphosphorous acid is sodium hypophosphite monohydrite.

16. The composition of claim 14 wherein the hypophosphorous acid is sodium hypophosphite monohydrite and one mole of said sulfoalkylated alkylene polyamine is reacted with a 2:1 mole ratio of formaldehyde and said sodium hypophosphite.

17. A composition having the formula:

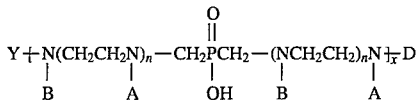

wherein n is a whole number of from 1–15; A, B, D and Y are the same or different and are independently selected from the group consisting of:
  a. hydrogen;
  b. carboxylic acid containing groups selected from the groups consisting of: alkyl substituted alkylene carboxylic acids containing 1 to 6 carbon atoms or salts thereof;
  c. methylenephonsphinic acid and salts thereof; and
  d. methylenephosphonic acid or its salts thereof;
wherein x is a whole number of from 1 to 20, and A,B,D, and Y taken together include per each mole of $N(CH_2CH_2N)$, at least 0.5 mole of methylene phosphonic acid or salts thereof and at least 0.5 mole of said carboxylic acid containing groups said composition being prepared by the steps of:
  i. Reacting a polyamine having the formula

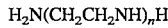

where n is a whole number of from 1 to 15 with sodium chloroacetate to produce a carboxyalkylated or sulfoalkylated polyamine;
  ii. Reacting said carboxyalkylated polyamine with a mixture of formaldehyde and a hypophosphorous acid selected from the group consisting of hypophosphorous acid and its water soluble salts to produce a linked polyamine; and then,
  iii. Reacting said linked polyamine with phosphorous acid and formaldehyde to produce a phosphonomethylated polyamine composition.

18. The composition of claim 17 wherein the hyphosphorous acid is sodium hypophosphite monohydrite.

19. The composition of claim 17 wherein the hypophosphorous acid is sodium hypophosphite monohydrite and said carboxymethylated alkylene polyamine is reacted with a 2:1 mole ratio of formaldehyde and said sodium hypophosphite.

* * * * *